Patented July 9, 1935

2,007,433

UNITED STATES PATENT OFFICE 2,007,433

HERBICIDE

Irving E. Melhus, Ames, Iowa

No Drawing. Application January 17, 1931,
Serial No. 509,546

11 Claims. (Cl. 167—45)

My invention relates to a liquid product which may be readily sprayed on weeds and grasses as a herbicide but which will have no injurious effect on the soil in subsequent cultivation.

The object of my invention is to provide an efficient herbicide of a comparatively inexpensive character to permit its extensive use by railroads along the right-of-ways and which will be non-toxic to man or livestock, while at the same time will leave no permanent herbicidal residue in the soil.

My improved weed killing product is of a character which will permit its extensive use by railroads, on farm lands, on roadsides, etc., and which is effective as a destroyer of perennial weeds,—such as quack grass and Canada thistle,—in cultivated fields and which will kill annual weeds in cultivated fields, but which contains no ingredient or material which will remain in the soil and act as a deterrent to plant growth over any considerable period of time.

My improved product consists of a fluid composition which may be readily sprayed and comprises the liquid compound furfural which is highly toxic to plants and relatively volatile and therefore will leave no injurious residue in the soil which in any way lessens the value of the land for subsequent cultivation or cropping purposes.

In addition to its toxicity and volatility, furfural has the ability to diffuse rapidly through the plant so that its toxic effect extends very rapidly to the whole of the plant treated.

With this ingredient of my improved product, namely the liquid compound furfural of relatively high toxicity, volatility, and affinity for plant tissue, I combine another liquid of lower volatility, toxicity and surface tension in order to retard or somewhat delay volatilization of the furfural so as to permit it to be more completely absorbed by the plants before volatilization. As an ingredient possessing the characteristics just mentioned, I employ a hydrocarbon distillate, preferably kerosene, or a petroleum distillate of substantially the same characteristics.

The admixture of these two ingredients results in a herbicidal mixture of much lower surface tension, which will readily spread and cover the plants or weeds, and consequently will penetrate into the plant tissue.

However, as furfural is only slightly soluble in kerosene, I find it advisable, in order to properly combine the two ingredients, to employ an emulsifying agent, as for example soap or a crude petroleum oil, such as that known to the trade as "Texaco Road Oil"; or to employ a mutual solvent, such as benzol, acetone, and the like.

Although the admixture of the furfural and kerosene in proportions ranging from five per cent (5%) kerosene and ninety-five per cent (95%) furfural to ninety-five per cent (95%) kerosene and five per cent (5%) furfural is effective, I have found a more economical and efficient form of my invention to be one consisting of eighty-nine (89) parts, by volume, of kerosene with one (1) part, by volume, of the emulsifying agent—as for example, "Texaco Road Oil"—and ten (10) parts, by volume, of furfural.

My improved weed destroying product of herbicide is prepared by first mixing the kerosene—or similar petroleum distillate—and the crude petroleum oil, such as the road oil mentioned,—or other emulsifying agent—and after these two ingredients have been thoroughly mixed, then adding the proper portion of furfural and thoroughly agitating the admixture.

The product is then ready for use and may be applied, either by means of a sprinkling can or power machine sprayer, in most cases at the rate of one hundred to three hundred gallons per acre, per application, depending upon the amount of surface vegetation. One application of the quantity mentioned will kill annuals, while two, or at most three, such applications are sufficient to kill perennials such as quack grass (*Agropyron repens*).

My improved product, if applied as just mentioned—namely at the rate of one hundred (100) to three hundred (300) gallons per acre, I have found will destroy the weeds promptly and completely.

On the other hand, I have also discovered that ordinary farm crops can be successfully raised on land that has been so treated immediately following the treatment and that no decrease in stand or yield results.

It is apparent, therefore, that my improved product makes it possible to free land of weeds through the simple expedient of spraying; and that it is possible to even utilize my invention as a substitute for cultivation in keeping land free from weeds during the period when crops are being grown thereon by applying my improved product between the rows or hills of the crops.

It will be understood that furfural may be combined with other liquids such as the various hydrocarbons derived from petroleum, coal, rosin, etc., or other chemical compounds equivalent to kerosene, namely those having a relatively low surface tension and low volatility; and the furfural may be combined with kerosene, or its equivalent, by means of a suitable emulsifying agent and solvents other than those herein mentioned, and variations in the proportions of the ingredients may be made, without, however, departing from the spirit of my invention.

What I claim is:

1. A herbicide comprising furfural and kerosene.

2. A herbicide comprising a homogeneous mixture of furfural and kerosene.

3. A herbicide comprising furfural, kerosene, and a substance capable of holding these in solution.

4. A herbicide comprising furfural, kerosene, and an emulsifying agent.

5. A herbicide comprising furfural, kerosene, and a heavy petroleum oil.

6. A herbicide which consists of a mixture of kerosene and a heavy petroleum oil, and furfural thoroughly admixed with said mixture in proportions of approximately eighty-nine parts by volume of kerosene, one part by volume of the heavy petroleum oil, and ten parts by volume of furfural.

7. A herbicide comprising furfural and a hydrocarbon distillate less volatile than furfural.

8. A herbicide comprising furfural and a petroleum distillate having substantially the same characteristics as kerosene in this composition.

9. A herbicide comprising a homogeneous mixture of furfural and a hydrocarbon distillate less volatile than furfural.

10. A herbicide comprising an emulsified mixture of furfural and a hydrocarbon distillate less volatile than furfural.

11. A herbicide comprising furfural and a hydrocarbon distillate less volatile than furfural dissolved by mutual solvent.

IRVING E. MELHUS.